(12) United States Patent
Buyuksahin

(10) Patent No.: US 10,795,507 B2
(45) Date of Patent: Oct. 6, 2020

(54) TOUCH PANEL

(71) Applicant: SENSOBRIGHT INDUSTRIES, LLC, Dover City, Kent County, DE (US)

(72) Inventor: Utku Buyuksahin, Kadikoy/Istanbul (TR)

(73) Assignee: SENSOBRIGHT INDUSTRIES, LLC, Dover, Kent County, DE (US)

( * ) Notice: Subject to any disclaimer, the term of this patent is extended or adjusted under 35 U.S.C. 154(b) by 0 days.

(21) Appl. No.: 16/099,279

(22) PCT Filed: Apr. 27, 2017

(86) PCT No.: PCT/TR2017/050167
§ 371 (c)(1),
(2) Date: Nov. 6, 2018

(87) PCT Pub. No.: WO2017/196280
PCT Pub. Date: Nov. 16, 2017

(65) Prior Publication Data
US 2019/0155453 A1    May 23, 2019

(30) Foreign Application Priority Data
May 13, 2016 (TR) .............................. a 2016 06367

(51) Int. Cl.
*G06F 3/042* (2006.01)

(52) U.S. Cl.
CPC ............ *G06F 3/0425* (2013.01); *G06F 3/042* (2013.01)

(58) Field of Classification Search
CPC .............................. G06F 3/0425; G01B 11/02
See application file for complete search history.

(56) References Cited

U.S. PATENT DOCUMENTS

| | | | |
|---|---|---|---|
| 7,540,644 B1 * | 6/2009 | Allen | G02B 6/0006 345/84 |
| 8,971,568 B1 * | 3/2015 | Smits | G06F 3/03545 382/100 |
| 2004/0141335 A1 * | 7/2004 | Lee | G02B 6/0006 362/555 |

(Continued)

FOREIGN PATENT DOCUMENTS

| EP | 1883008 A2 | 1/2008 |
|---|---|---|
| EP | 2807463 A1 | 12/2014 |

(Continued)

OTHER PUBLICATIONS

Jackson (Jackson et al.: "Fiberboard", Proceedings of the ACM International Conference on Interactive Tabletops and Surfaces, pp. 25-28, Banff, Alberta, Canada—Nov. 23-25, 2009, ACM New York, NY, USA © 2009, doi>10.1145/1731903.1731908, retrieved from web Sep. 27, 2019 (Year: 2009).*

(Continued)

*Primary Examiner* — Mark Edwards
(74) *Attorney, Agent, or Firm* — Notaro, Michalos & Zaccaria P.C.

(57) ABSTRACT

The touch panel may be used in any medium, device or system and even an application with a rough surface that has touch properties that detects a touch position and pattern of any desired object that is resistant to environmental effects with a high number of points that may be detected at a time.

18 Claims, 3 Drawing Sheets

(56) References Cited

U.S. PATENT DOCUMENTS

| | | | | |
|---|---|---|---|---|
| 2006/0203240 | A1* | 9/2006 | Ingleson | G01J 3/02 |
| | | | | 356/319 |
| 2006/0251365 | A1* | 11/2006 | Brewer | G02B 6/08 |
| | | | | 385/116 |
| 2010/0073328 | A1 | 3/2010 | Lynch et al. | |
| 2015/0109607 | A1* | 4/2015 | Buyuksahin | G01L 5/228 |
| | | | | 356/32 |

FOREIGN PATENT DOCUMENTS

| | | | | |
|---|---|---|---|---|
| GB | 2475519 A | | 5/2011 | |
| NL | 2011177 C | | 7/2013 | |
| NL | 2011177 C | * | 1/2015 | G06F 3/042 |

OTHER PUBLICATIONS

Jackson (D. Jackson, et al.. 2009. FiberBoard: compact multi-touch display using channeled light. Proc. of the ACM International Conference on Interactive Tabletops and Surfaces (ITS '09). Assn for Computing Machinery, New York, NY, USA, 25-28. DOI: https://doi.org/10.1145/1731903.1731908) (Year: 2009).*
International Search Report and Written Opinion for corresponding PCT application No. PCT/TR2017/050167, dated Aug. 30, 2017.
International Preliminary Report on Patentability for corresponding PCT application No. PCT/TR2017/050167, dated Aug. 24, 2018.
Written Opinion of the International Preliminary Examining Authority for corresponding PCT application No. PCT/TR2017/050167, dated Apr. 20, 2018.

* cited by examiner

TOUCH PANEL

RELEVANT TECHNICAL FIELD

The present invention relates to touch panels that detect touch.

BACKGROUND ART

Electronic devices that interact with users may comprise a human interface device for receiving at least one input from the users. With the said human interface devices, data in various formats (writing, sound or image etc.) may be inputted into the electronic device.

In conventional applications, human interface devices such as mouse and keyboard are used to input data into electronic devices such as computers, and to use the electronic device. But with the advanced technology, human interface devices such as mouse and keyboard are replaced by touch panels having a more compact form. Said touch panels are generally positioned on a screen. When the users touch the panel, touch point or points are detected so that operations dedicated to the respective point or points may be performed. For example, if one touches the letters/symbols on the virtual keyboard provided on the screen, the relevant letter/symbol is inputted into the electronic device.

In the prior art, the touch panels mainly use two types of sensing systems. One of the said systems is resistive touch panel and the other is capacitive touch panel. In resistive touch panels, a change in the resistance of the components in the panel is detected based on the force applied on the panel. Based on the information indicating a change of resistance and in which one of the components, a position of the touch is detected. In capacitive touch panels, a finger placed on the panel (or another suitable object such as a touch pen) changes capacitance value of the components in the panel so that a position of the touch is detected. However, magnetic resistance of the said applications is low and the number of the touches that may be detected at a time is limited. Furthermore, in the said applications, a touch of any desired object cannot be detected.

BRIEF DESCRIPTION OF THE INVENTION

With the present invention, there is provided a touch panel comprising at least one surface layer made of a rigid and transparent material (e.g. glass, plexiglass); at least one light source; at least one image sensor; at least a first fiber optic bundle comprising a plurality of fiber optic cables, a tips of which is positioned facing to the light source and other tips of which is positioned facing to the said surface layer, and transmitting the light obtained from the light source to the surface layer; at least a second fiber optic bundle comprising a plurality of fiber optic cables, a tips of which is paired with at least one pixel of the image sensor and other tips of which is positioned facing to the said surface layer, and transmitting the image received from the surface layer to the image sensor; at least one control unit which analyzes the image captured by the image sensor using image processing techniques so as to identify a position of at least one object which contacts to the surface layer; and at least a first data link for data communication between the image sensor and the control unit.

In the touch panel according to the present invention, an object that contacts to the surface layer is illuminated by the light source so that an image thereof is captured by the image source. The image captured is analyzed by the control unit using image processing techniques, and thus the point of touch can be detected in an easy, practical and precise manner. Since the detection is performed by means of the image, a touch position and pattern of any desired object can be detected.

OBJECT OF THE INVENTION

An object of the present invention is to provide a touch panel capable of detecting touch.

Another object of the present invention is to provide a touch panel for detecting the touch of different objects.

Another object of the present invention is to provide a touch panel that is resistant against environmental effects.

Yet another object of the present invention is to provide a touch panel wherein the number of the points that can be detected at a time is high.

DESCRIPTION OF THE DRAWINGS

Illustrative embodiments of the touch panel according to the present invention are illustrated in the enclosed drawings, in which.

Figure 1:
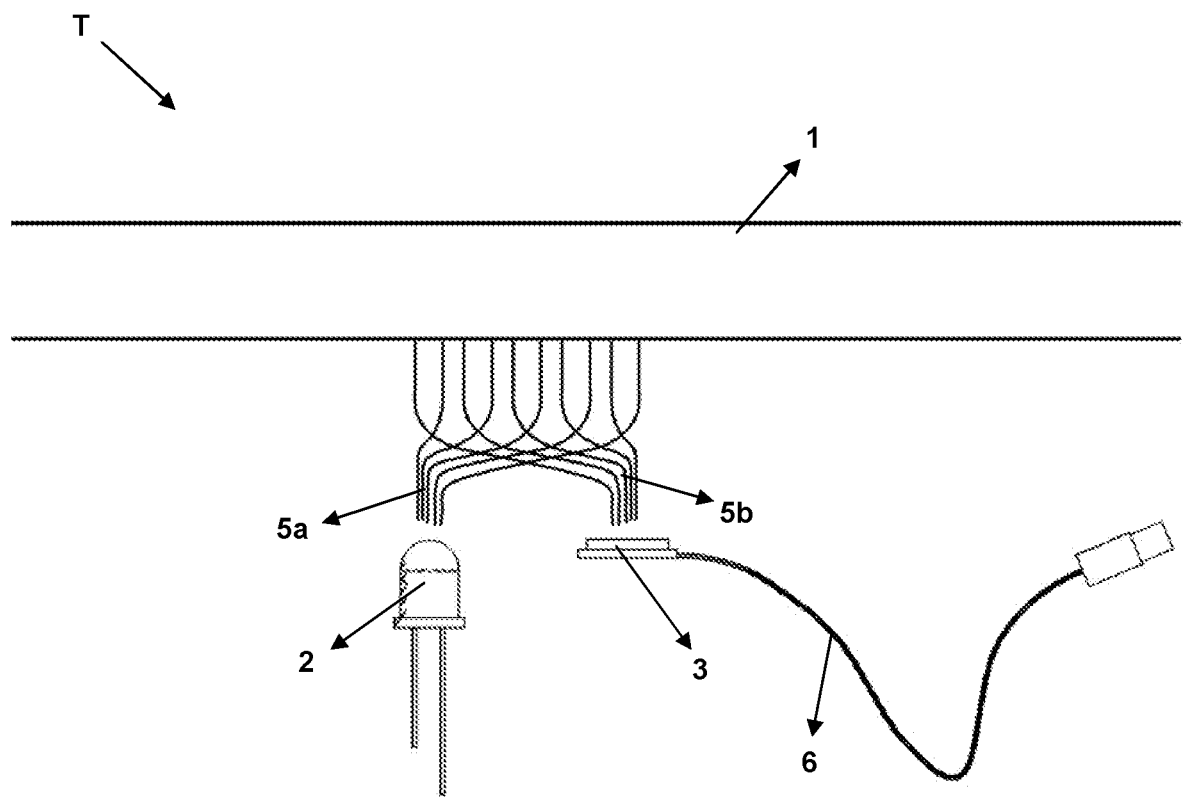
FIG. 1 is side view of a touch panel.

All the parts illustrated in the drawings are individually assigned a reference numeral and the corresponding terms of these numbers are listed as follows:

Touch panel (T)
Surface layer (1)
Light source (2)
Image sensor (3)
Image source (4)
First fiber optic bundle (5*a*)
Second fiber optic bundle (5*b*)
Third fiber optic bundle (5*c*)
First data link (6)
Second data link (7)

DESCRIPTION OF THE INVENTION

In electronic devices offering user interaction such as computers, mobile phones and televisions, commands/data from the users are inputted into the electronic device via human interface devices. Since touch panels are compact and practical, they are preferred in many electronic devices as human interface devices. Therefore, with the present invention, there is provided a touch panel.

Figure 2:
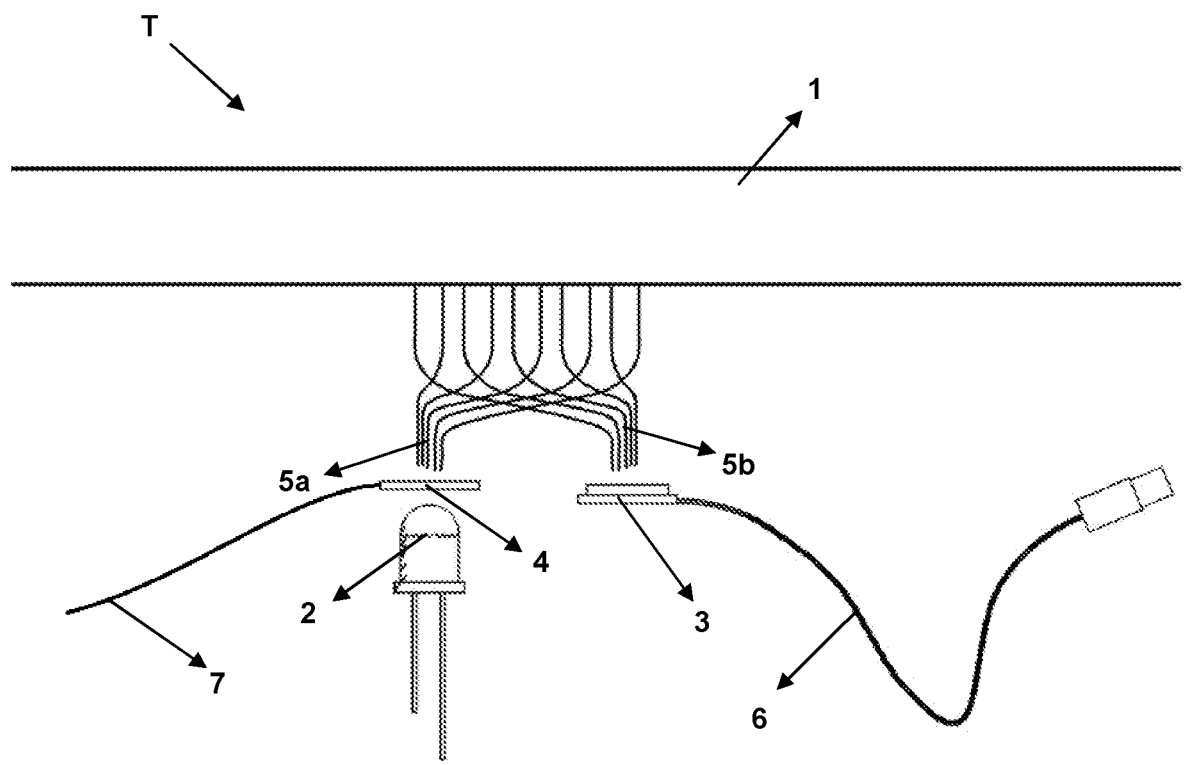
FIG. 2 is a side view of an exemplary embodiment of the touch panel.
Figure 3:
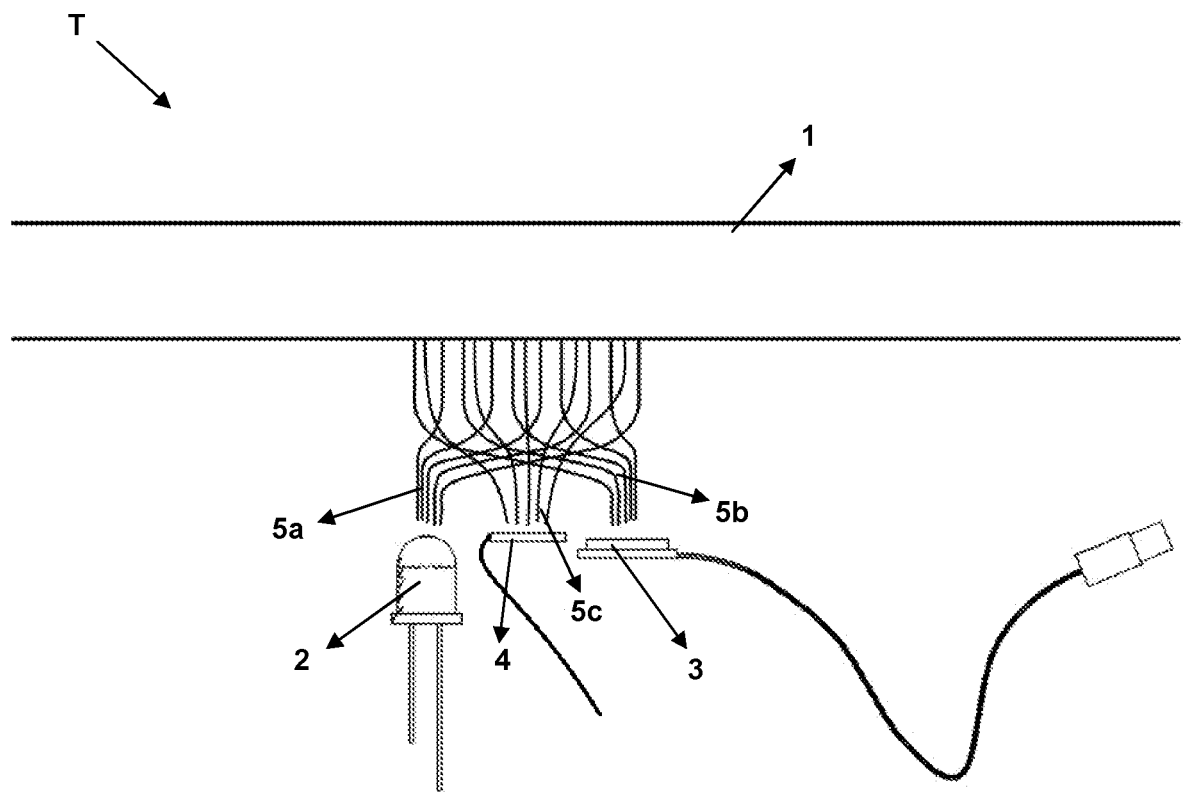
FIG. 3 is a side view of another exemplary embodiment of the touch panel.

The touch panel (T) according to the present invention, as illustrated in FIGS. 1-3, comprises at least one surface layer (1) made of a rigid (with low elastic coefficient) and transparent material (e.g. glass, plexiglass); at least one light source (2); at least one image sensor (3) ((i.e. a CCD, CMOS sensor etc.); at least a first fiber optic bundle (5*a*) comprising a plurality of fiber optic cables, a tips of which is positioned facing to the light source (2) and other tips of which is positioned facing to the said surface layer (1), and transmitting the light obtained from the light source (2) to the surface layer (1); at least a second fiber optic bundle (5*b*) comprising a plurality of fiber optic cables, a tips of which is paired with at least one pixel of the image sensor (3) and other tips of which is positioned facing to the said surface layer (1), and transmitting the image received from the surface layer (1) to the image sensor (3); at least one control unit (not shown in the figures) which analyzes the image captured by the image sensor (3) using image processing techniques so as to identify a position of at least one object which contacts to the surface layer (1); and at least a first data link (6) for data communication between the image sensor (3) and the control unit. The first data link (6) may be a wired connection or a wireless connection.

In an illustrative embodiment, the touch panel (T) according to the present invention may be placed on a screen in order to impart touch properties to the said screen. In this embodiment, light beams generated by the said light source (2) are transmitted to the surface layer (1) by the first fiber optic bundle (5a). The light beams pass through the transparent surface layer (1) and reach to the surrounding environment. When an object (for example, a finger of the user or a pen) is placed on the surface layer (1), the light beams transferred to the surrounding environment illuminate the said object. An image of the illuminated object is transmitted to the image sensor (3) by the second fiber optic bundle (5b). The image frame captured by the image sensor (3) is analyzed by the control unit using image processing techniques and the position of the said object on the surface layer (1) (i.e. on the screen) is determined. Here, since the image frame captured by the image sensor (3) is used to detect the position of the touch, a desired number of the touch points can be detected at a desired moment. Furthermore, thanks to a change (e.g. an increase) in the brightness of the light source (2), an object may be detected even before it touches on the surface layer (1).

In the touch panel (T) according to the present invention, since the image frame captured by the image sensor (3) is used for detecting touch, a touch of the different objects can be detected and objects that contact to the touch panel (T) may be distinguished. For instance, by using colors and/or shapes of the objects, a distinction is made whether the object that contacts to the touch panel (T) is a finger of the user or another object. In another illustrative embodiment, if a finger touches on the touch panel (T), the fingerprint of the user may also be detected by means of the image frame captured by the image sensor (3). Thus, only the fingerprints of the authorized persons are detected so that unauthorized persons are prevented from making any actions on the electronic device comprising the touch panel (T).

In another preferred embodiment of the invention, the touch panel (T) comprises at least one image source (4) that generates at least one image and transmits the image generated to the surface layer (1). Said image source (4) is preferably connected to the said control unit by means of at least a second data link (7). Thus, the image that will be obtained in the image source (4) may be controlled by the control unit. By transferring the image obtained in the image source (4) to the surface layer (1), said image is provided to the users (i.e. the touch panel (T) is rendered as a touch screen). In this embodiment, the image source (4) may be positioned at a desired distance from the surface layer (1). Thus, the image source (4) and/or the image sensor (3) are for example positioned in an isolation medium (for example, in a Faraday cage) wherein they are protected from environmental effects such as radiation whereas the touch panel (T) is positioned in the outer environment. Said image source (4) may either be in the form of an LCD panel, or a panel, each pixel of which comprising a RGB LED.

In an illustrative embodiment, the image source (4) is interposed between the light source (2) and the first fiber optic bundle (5a), as shown in FIG. 2. In this embodiment, a tips of the fiber optic cables in the first fiber optic bundle (5a) facing to the light source (2) is paired with at least one pixel of the image source (4). In this embodiment, it is ensured that the first fiber optic bundle (5a) transfers, to the surface layer (1), the image generated by the image source (4) and the light beams generated by the light source (2).

In a preferred embodiment of the invention, the touch panel (T) comprises a plurality of distribution members (not shown in the figures), each being connected to a tip of a fiber optic cable of the first fiber optic bundle (5a) facing to the surface layer (1), and distributing the image carried by the fiber optic cable it is connected, to a specific area.

Said distribution member may be in the form of a plexi or a lens. With the distribution member, an image obtained in the image source (4) may be dimensioned as desired. Here, each distribution member forms a pixel in the resulting final image. By adjusting the dimensions of the distribution member, the dimensions of the final image may also be adjusted. Thus, a screen with dimensions of several meters may for example be achieved using an image source (4) with dimensions of several centimeters.

In an alternative embodiment of the invention shown in FIG. 3, said image source (4) is positioned independent from the light source (2). The touch panel (T) of this embodiment comprises at least a third fiber optic bundle (5c) comprising a plurality of fiber optic cables, a tips of which is paired with at least one pixel of the image source (4) and other tips of which is positioned facing to the said surface layer (1), and transmitting the image generated in the image source (4) to the surface layer (1). Here, said light source (2) may be configured to emit infrared light and said image sensor (3) may be configured to detect infrared light. The light emitted may have varying wavelengths (visible light, infrared light etc.), or may be at different blink frequencies (for example, constant blinking, fixed-frequency blinking, blinking at a frequency varied in a predetermined order). Thus, the light transmitted by the system for sensing may be distinguished from the images that may come from the surrounding environment and other lights, and it may be prevented that those lights other than the ones transmitted by the system cause an erroneous detection. In the said embodiments, the image sensor (3) is selected such that it senses the wavelength (i.e. infrared) and the frequency of the light source used (for example, a high frequency camera sensor).

In another preferred embodiment of the invention, the touch panel (T) comprises a plurality of distribution members (not shown in the figures), each being connected to a tips of a fiber optic cable of the third fiber optic bundle (5c) facing to the surface layer (1), and distributing the image transferred by the fiber optic cable it is connected, to a specific area. Said distribution member may be in the form of a plexi or a lens.

In another preferred embodiment of the invention, the touch panel (T) comprises at least one lens unit (not shown in the figures) located at that side of the first fiber optic bundle (5a), the second fiber optic bundle (5b) and/or the third fiber optic bundle (5c) facing to the surface layer (1). The said lens unit ensures transmitting, to the surface layer (1), of the lights transmitted from the image source (4) to the surface layer (1) via the first fiber optic bundle (5a) or the third fiber optic bundle (5c), at the desired angle and dimension. Thus, the image obtained in the image source (4) is transmitted to the surface layer (1) without being deformed. Likewise, the lens unit ensures that the lights transmitted from the surface layer (1) to the second fiber optic bundle (5b) are inputted at the desired angle and dimension. Thus, a clear image is obtained in the image sensor (3). Furthermore, it is thus possible to arrange the fiber optic cables at a lower interval without any loss in the detection.

The touch panel (T) according to the present invention may be used at any medium, device or system with touch feature (for example, a curved screen, a dome-shaped structure, a glass computer keyboard, a glass piano, a scoreboard, a touch display window, a car console, an application with rough surface).

In another alternative embodiment of the invention, the first fiber optic bundle (5a), the second fiber optic bundle (5b) and/or the third fiber optic bundle (5c) are multi-piece bundles. In this embodiment, the first optic bundle (5a), the second fiber optic bundle (5b) and/or the third fiber optic bundle (5c) comprise a first section including a plurality of fiber optic cables; a second section including a plurality of fiber optic cables; and a carrier fiber optic cable, to end of which is connected a tip of each fiber optic cable in the said first section and to another end of which is connected a tip of each fiber optic cable in the said second section, whose diameter is larger than that of the fiber optic cables in the first section and the second section, and which transmits the lights carried by the fiber optic cables in the first section to the fiber optic cables in the second section and the lights carried by the fiber optic cables in the second section to the fiber optic cables in the first section. In this way, in the embodiments wherein the length of the fiber optic cables must be long, it will be sufficient that one or a limited number of fiber optic cables (carrier fiber) is long, instead of a high number of fiber optic cables. In another embodiment of the carrier fiber, the diameter of the said carrier fiber optic cable is lower than that of the first section and the second section. In this embodiment, in order to have an exact pairing of each fiber optic cable in the first section with each fiber optic cable in the second section (i.e. to ensure that the light beams coming from different fiber optic cables do not intervene with each other), the first optic bundle (5a), the second fiber optic bundle (5b) and/or the third fiber optic bundle (5c) also comprise at least two optic elements, each interposed between the carrier fiber optic cable and the first section, and between the carrier fiber optic cable and the second section. The said optic elements prevent the light beams flowing through the carrier fiber optic cable from intervening with each other.

In another preferred embodiment of the invention, the touch panel (T) comprises a laser pointer (not shown in the figures) emitting light of a specific frequency and/or wavelength so as to use it from the desired distance. With the said laser pointer, the users may send laser light on the surface layer (1) from the desired distance. The laser light directed on the surface layer (1) passes through the second fiber optic (5b) into the image sensor (3) so that it is detected on which point of the surface layer (1) the laser light is directed. Thus, remote command may be sent to the touch panel (T) without touching it.

In alternative embodiments, the touch panel (T) according to the present invention may for example be used in a gun simulation. In this embodiment, said laser pointer is in the form of a gun, and by using the laser pointer, laser lights are directed on the touch panel (T) in order to take a shot. The point where the laser light contacts to the touch panel (T) is detected as the area of shot and the accuracy of the shot may be determined. Here, since the laser lights from different laser pointers (different guns) blink with different colors and/or different frequencies, guns may be distinguished from each other.

In alternative embodiments of the invention, said surface layer (1) may have a multi-piece form. In this embodiment, a portion of the image obtained in the image source (4) is transferred to a piece by means of the first fiber optic bundle (5a) and another portion of which is transferred to another piece by means of the other first fiber optic bundle (5a). Thus, a plurality of touch screen structures is achieved using a single image source (4).

In the touch panel (T) according to the present invention, an object that contacts to the surface layer (1) is illuminated by the light source (2) so that an image thereof is captured by the image source (4). The image captured is analyzed by the control unit using image processing techniques, and thus the point of the touch can be detected in an easy, practical and precise manner. Since the detection is performed by means of image, the touch position of any desired object (specifically an object which is not transparent and not absorbing light generated by the light source (2)) may be detected.

The invention claimed is:

1. A touch screen device (T), characterized by comprising:
   at least one surface layer (1) made of a rigid and transparent material;
   at least one light source (2);
   at least one image sensor (3);
   at least a first fiber optic bundle (5a) which comprises a plurality of fiber optic cables, tips of which are positioned facing to the light source (2) and other tips of which are positioned facing to the said surface layer (1) and distributed over a first area of said surface layer (1), and which transmits the light obtained from the light source (2) to the surface layer (1);
   at least a second fiber optic bundle (5b) which comprises a plurality of fiber optic cables, tips of which are paired with at least one pixel of the image sensor (3) and other tips of which are positioned facing to the said surface layer (1) and distributed over a second area of said surface layer (1) said second area overlapping with said first area, and which transmits the image received from the surface layer (1) to the image sensor (3);
   at least one control unit which analyzes the image captured by the image sensor (3) using image processing techniques so as to identify a position of at least one object which contacts to the surface layer (1); and
   at least a first data link (6) for data communication between the image sensor (3) and the control unit
   at least one image source (4) that generates at least one image and transmits the image generated to the surface layer (1)
   characterized in that, either said image source (4) is interposed between the light source (2) and the tips of the first fiber optic bundle (5a) that faces to the light source (2), wherein the tips of the fiber optic cables in the first fiber optic bundle (5a) that faces to the light source (2) are paired with at least one pixel of the image source (4), or touch panel (T) further comprises at least a third fiber optic bundle (5c) comprising a plurality of fiber optic cables, tips of which are paired with at least one pixel of the image source (4) and other tips of which are positioned facing to the said surface layer (1), and transmitting the image generated in the image source (4) to the surface layer (1); and in that, said image sensor (3) is in the form of a CCD or CMOS sensor.

2. A touch screen device (T) according to claim 1, characterized by comprising at least a second data link (7) for data communication between the said image source (4) and the control unit.

3. A touch screen device (T) according to claim 1, characterized in that the said image source (4) is in the form of an LCD panel.

4. A touch screen device (T) according to claim 1, characterized in that the said image source (4) is in the form of a panel, each pixel of which including a RGB LED.

5. A touch screen device (T) according to claim 1, characterized by comprising a plurality of distribution members, each being connected to a tip of a fiber optic cable of the first fiber optic bundle (5a) facing to the surface layer (1), and distributing the image carried by the fiber optic cable it is connected, to a specific area.

6. A touch screen device (T) according to claim 1, characterized by comprising a plurality of distribution members, each being connected to a tip of a fiber optic cable of the third fiber optic bundle (5c) facing to the surface layer (1), and distributing the image carried by the fiber optic cable it is connected, to a specific area.

7. A touch screen device (T) according to claim 1, characterized by comprising at least one lens unit located at that side of the first fiber optic bundle (5a) and/or the second fiber optic bundle (5b) facing to the surface layer (1).

8. A touch screen device (T) according to claim 1, characterized by comprising at least one lens unit located at that side of the third fiber optic bundle (5c) facing to the surface layer (1).

9. A touch screen device (T) according to claim 1, characterized in that the first fiber optic bundle (5a) and/or the second fiber optic bundle (5b) comprises a first section including a plurality of fiber optic cables; a second section including a plurality of fiber optic cables; and a carrier fiber optic cable, to end of which is connected a tip of each fiber optic cables in the said first section and to another end of which is connected a tip of each fiber optic cable in the said second section, whose diameter is larger than that of the fiber optic cables in the first section and the second section, and which transmits the lights carried by the fiber optic cables in the first section to the fiber optic cables in the second section and the lights carried by the fiber optic cables in the second section to the fiber optic cables in the first section.

10. A touch screen device (T) according to claim 9, characterized in that the first fiber optic bundle (5a) and/or the second fiber optic bundle (5b) comprise at least two optic elements.

11. A touch screen device (T) according to claim 1, characterized in that the third fiber optic bundle (5c) comprises a first section including a plurality of fiber optic cables; a second section including a plurality of fiber optic cables; and a carrier fiber optic cable, to end of which is connected a tip of each fiber optic cables in the said first section and to another end of which is connected a tip of each fiber optic cable in the said second section, whose diameter is larger than that of the fiber optic cables in the first section and the second section, and which transmits the lights carried by the fiber optic cables in the first section to the fiber optic cables in the second section and the lights carried by the fiber optic cables in the second section to the fiber optic cables in the first section.

12. A touch screen device (T) according to claim 11, characterized in that the third fiber optic bundle (5c) comprises at least two optic elements.

13. A touch screen device (T) according to claim 1, characterized by comprising a laser pointer emitting light signal that blinks at a certain frequency and/or at a frequency varied in a predetermined order and/or has a wavelength.

14. A touch screen device (T) according to claim 1, characterized in that the said laser pointer is in the form of a gun and/or is mountable to a gun.

15. A touch screen device (T) according to claim 1, characterized in that the said light source (2) emits infrared light.

16. A touch screen device (T) according to claim 15, characterized in that the said image sensor (3) detects infrared light.

17. A touch screen device (T) according to claim 1, characterized in that the said light source (2) emits light of varying wavelengths.

18. A touch screen device (T) according to claim 1, characterized in that the said light source (2) emits light that blinks at varying frequencies.

* * * * *